United States Patent
Ley et al.

(10) Patent No.: US 8,380,623 B1
(45) Date of Patent: Feb. 19, 2013

(54) SYSTEMS AND METHODS FOR ENABLING FINANCIAL SAVINGS

(75) Inventors: Michael S. Ley, Moon Township, PA (US); Bryan L. Maokrell, Cranberry Township, PA (US); Christine Johns, Allison Park, PA (US); Jennifer Marie Levin, Chicago, IL (US); Marleke Smets, Chicago, IL (US); Chui-Ling Michelle Moy, Chicago, IL (US); David Wisely Vondle, Chicago, IL (US)

(73) Assignee: The PNC Financial Services Group, Inc., Pittsburgh, PA (US)

( * ) Notice: Subject to any disclaimer, the term of this patent is extended or adjusted under 35 U.S.C. 154(b) by 811 days.

(21) Appl. No.: 12/367,616

(22) Filed: Feb. 9, 2009

Related U.S. Application Data

(60) Provisional application No. 61/065,134, filed on Feb. 8, 2008, provisional application No. 61/027,946, filed on Feb. 12, 2008, provisional application No. 61/073,851, filed on Jun. 19, 2008.

(51) Int. Cl.
*G06Q 20/10* (2012.01)
(52) U.S. Cl. .................. 705/39; 705/35; 705/40
(58) Field of Classification Search .................. 705/39, 705/35, 40
See application file for complete search history.

(56) References Cited

U.S. PATENT DOCUMENTS

| | | | |
|---|---|---|---|
| 5,214,579 A | 5/1993 | Wolfberg et al. | |
| 5,947,526 A | 9/1999 | Neu | |
| 6,064,984 A | 5/2000 | Ferguson et al. | |
| 6,128,603 A | 10/2000 | Dent et al. | |
| 6,411,938 B1 | 6/2002 | Gates et al. | |
| 6,839,687 B1 | 1/2005 | Dent et al. | |
| 2001/0023414 A1* | 9/2001 | Kumar et al. | 705/35 |
| 2003/0009402 A1* | 1/2003 | Mullen et al. | 705/35 |
| 2005/0137953 A1 | 6/2005 | McDonough et al. | |
| 2005/0222951 A1 | 10/2005 | Sherman | |
| 2007/0005496 A1 | 1/2007 | Cataline et al. | |
| 2007/0083465 A1 | 4/2007 | Ciurea et al. | |
| 2007/0100749 A1 | 5/2007 | Bachu et al. | |
| 2007/0162387 A1 | 7/2007 | Cataline et al. | |
| 2007/0214162 A1 | 9/2007 | Rice | |
| 2009/0187505 A1* | 7/2009 | Ariely | 705/39 |

OTHER PUBLICATIONS

MyCheckFree.com, Printed from https://mycheckfree.com/br/wps?sp=10001&rq=bfbl on Sep. 14, 2007.
Paytrust: Paying Bills Has Never Been Easier, Printed from http://paytrust.com/learnmore.shtml on Sep. 14, 2007.
Pocket Quicken, Printed from http://www.landware.com/pocketquicken/ on Sep. 14, 2007.
Personal Budget Software-Quicken Starter Edition 2008, Printed from http://quicken.intuit.com/personal-finance/starter-edition-personal-budget.jhtml on Sep. 14, 2007.
United One Credit Union, Printed from http://www.unitedone.org/ASP/home.asp on Sep. 14, 2007.

* cited by examiner

*Primary Examiner* — Jagdish Patel
(74) *Attorney, Agent, or Firm* — Jonathan C. Parks, Esq.; Pietragallo Gordon Alfano Bosick & Raspanti, LLP

(57) ABSTRACT

A computer-assisted method for facilitating financial savings. The method includes accepting a funds transfer request by the user of an amount of funds between a funding account and at least one receiving account and accepting, from a user, a designation of an intended purpose of use of the amount of funds and a date of intended use of the amount of funds. The method also includes transferring the amount of funds from the funding account to the at least one receiving account and generating, for display on a graphical banking interface, a graphical representation of the designation of the intended purpose of use of the amount of funds. The method further includes transferring the amount of funds from the at least one receiving account to the funding account on the date of intended use.

13 Claims, 32 Drawing Sheets

_30_

Welcome to your new account!
In order to optimize your experience we would like to ask you some details that will help us to customize this website specifically for you. This information will be kept private and will not be used for any other purpose.
When is your next pay date? ☐
How much do you earn? $ ☐
How frequently are you paid? ☐
(Skip this step) (Accept)

_32_

| 30 | 31 | 1 | 2 |
|---|---|---|---|
| $6000.00 ⊕$6000.00 ⊕ $50.00 | 7 | 8 ⊕ Payday | 9 |
| 13 | 14 | 15 | 16 |

_34_

Bill Reminders ☐ New          Set Reminder

Tips of use:
In this section you will be notified of your upcoming bills (only elegible Payees). Paying your bills through your My Money account will allow you to schedule payment on your most convienent date and never be late with bill payment again.
See how to schedule a bill payment here.

_36_

No scheduled bills

Available:    ◁▷   Reserve:
$6000.00        $50.00

_38_     _40_

| No Scheduled Bills (Pay Bill) | Reserve (Add Item) |
|---|---|
| Tips of use: This section will list your bill payments from the day you schedule them until the day the money actually leaves your account. Schedule your first bill payment here. | Tips of use: This section will list your wish list items and the defined allocation of your Reserve fund. Create your first wish item here. Unallocated: *Interest on Reserve (1.1%): $0.00 |
| Total Scheduled:    $0.00 | Total Reserve:    $50.00* |

FIG. 2

|   |   |   |   | 32 |
|---|---|---|---|---|
| | | | | |
| 6 $+ \ \$6000.00$ $+ \ \$50.00$ | $\$6050.00$ $\ominus \ \$990.15$ 42 | 8 | 9 Pay date | |
| 13 | 14 | 15 | 16 | |

44

| Past Balance $0.00 | IN $6000.00  OUT $17.45  Available balance $5982.55 | ─── $17.45 ─── ✕ 🅢 ⊙ 🍺 🛒 🛏 🍸 ⛽ 🏠 |
|---|---|---|

| Date | Description | Category | Deposits | Debits | Available balance | Reserve balance |
|---|---|---|---|---|---|---|
| 09/07/2007 | Gas Station | 🚗 | | $17.45 | $5982.55 | |
| 09/06/2007 | New account match | | $50.00 | | | $50.00 |
| 09/06/2007 | Initial deposit | | $6000.00 | | $6000.00 | |
| | | | | | | |

| Calendar | Account Detail | Recent Activities | Bills | Savings Rules | Alerts |

[Month][Week][Day]  October 2007  ⟋32

| Sunday | Monday | Tuesday | Wednesday | Thursday | Friday | Saturday |
|---|---|---|---|---|---|---|
| 29 | 30 | 1<br>⊕ Payday | 2 | 3<br>⊖ $26.39 | 4 | 5 |
| 6 | 7 | 8 | 9 | 10<br>⊖ $63.00 | 11 | 12 |
| 13 | 14 | 15<br>⊕ Payday | 16 | 17 | 18 | 19 |
| 20 | 21 | 22 | 23 | 24 | 25 | 26 |
| 27 | 28 | 29<br>⊕ Payday | 30 | 31 | 1 | 2 |

(Set Payday) (Schedule Bill)

FIG. 5

| My Accounts | Transfer Funds | Profile Settings | My Offers | | | Sign Off |
|---|---|---|---|---|---|---|
| My Money $1579.04 | Growth $3288.00 | Credit Card -$200.34 | Other $5311.00 | Liability $200.34 | Assets $10178.04 | |
| Calendar | Account Detail | Recent Activities | Bills | Savings Rules | Alerts | |

[Month] [Week] [Day]   September 2007    ⌐32

| Sunday | Monday | Tuesday | Wednesday | Thursday | Friday | Saturday |
|---|---|---|---|---|---|---|
| 1 | 2 | 3 | 4 | 5 | 6 | 7 |
| 8 | 9 | 10 ⊖ $250.00 | 11 ⊕ $100.00 | 12 | 13 | 14 ⊖ $9.17 |
| 15 ⊖ $17.45 | 16 ⊕ $200.00 | 17 ⊕$1510.00 ⊖ $80.00 | 18 $1377.44 ⊖-$253.12 | 19 ⊖ $87.14 | 20 | 21 |
| 22 | 23 ⚠ 68⌐ ⊖$500.00 | 24 ⊖$100.00 | 25 | 26 62⌐ | 27 | 28 |
| 29 | 30 60⌐ | 1 ⊕ Payday | 2 | 3 ⊖ $26.39 | 4 | 5 |

(Set Payday) (Schedule Bill)
64⌐

| Bill Reminders 2 New | | | Add reminder |
|---|---|---|---|
| Bill | Due Date | Amount | |
| Telephone XXXX8634 | 09/23/07 | $59.49 | (Schedule Bill) |
| Credit Card XXXX1233 | 10/07/07 | $744.21 | (Schedule Bill) |

| Add Paper Check Payment | | | ☒ ? |
|---|---|---|---|
| Payee | Dad | Amount | $100.00 |
| Date | 6/9/08 | Check No. | 132 |
| Memo | | | |

FIG. 7A

| My Check List | | | | Add |
|---|---|---|---|---|
| 132 | Dad | $100.00 | 6/9/08 | Delete |
| 133 | Joe | $200.00 | 6/21/08 | Delete |

FIG. 7B

|   |    |    |    |    |    |    |
|---|----|----|----|----|----|----|
| 9 | 10 | 11 | 12 | 13 | 14 | 15 |
| Check 132 |    |    |    |    |    |    |
| 16 | 17 | 18 | 19 | 20 | 21 | 22 |

FIG. 7C

|   |    |    |    |    |    |    |
|---|----|----|----|----|----|----|
| 9 | 10 | 11 | 12 | 13 | 14 | 15 |
|   |    |    |    |    |    | Check 132 |
| 16 | 17 | 18 | 19 | 20 | 21 | 22 |

FIG. 7D

| My Accounts | Transfer Funds | Profile Settings | My Offers | | | Sign Off |
|---|---|---|---|---|---|---|
| My Money $1579.04 | Growth $3288.00 | Credit Card -$200.34 | Other $5311.00 | Liability $200.34 | Assets $10178.04 | |
| Calendar | Account Detail | Recent Activities | Bills | Savings Rules | Alerts | |

Month | Week | Day

September 2007  /32

| Sunday | Monday | Tuesday | Wednesday | Thursday | Friday | Saturday |
|---|---|---|---|---|---|---|
| 15 | 16 | 17 | 18 Total Available $1377.44 | 19 | 20 | 21 |
| Total Out ⊖ $17.45 ⊖ $17.45 | Total In ⊕ $200.00 ⊕ $200.00 | Total Out ⊖ $80.00 ⊖ $80.00 | Total Out ⊖ $253.12* ⊖ $144.33 ⊖ $96.45 ⊖ $12.34* Total In ⊕ $1510.00 ⊕ $1510.00 *Pending Item | ⊖ $74.11 Payee: XYZ | | |

(Set Payday) (Schedule Bill)

| Bill Reminders 2 New | | | Add Reminder |
|---|---|---|---|
| Bill | Due Date | Amount | |
| Telephone XXXX8634 | 09/23/07 | $59.49 | (Schedule Bill) |
| Credit Card XXXX1233 | 10/07/07 | $744.21 | (Schedule Bill) |

FIG. 9

| My Accounts | Transfer Funds | Profile Settings | My Offers | | Sign Off |
|---|---|---|---|---|---|
| My Money $1579.04 | Growth $3288.00 | Credit Card -$200.34 | Other $5311.00 | Liability $200.34 | Assets $10178.04 |
| Calendar | Account Detail | Recent Activities | Bills | Savings Rules | Alerts |

[Month] [Week] [Day]    September 2007    ⟋32

| Tuesday | Wednesday | Thursday |
|---|---|---|
| 17 | 18 Total Available: $1377.44 (with reserve $1579.04) | 19 ⊖ $74.11 Payee: XYZ [Edit] |
| ⊖ Total Out $80.00 | ⊖ Total Out $253.12* POS Debit Card Purchase... $144.33 POS Debit Card at 625... $96.45 Point of Sale Purchase... $12.34* *Pending Item | |
| ⊕ Total In $1510.00 Payday $1510.00 | Scheduled (until Oct. 1st) $687.14 | Free $690.30 | Reserve $201.60 | |

[Set Payday] [Schedule Bill]

Bill Reminders  2 New                                      Add Reminder

| Bill | Due Date | Amount | |
|---|---|---|---|
| Telephone XXXX8634 | 09/23/07 | $59.49 | [Schedule Bill] |
| Credit Card XXXX1233 | 10/07/07 | $744.21 | [Schedule Bill] |

| My Accounts | Transfer Funds | Profile Settings | My Offers | | Sign Off |
|---|---|---|---|---|---|
| My Money $1579.04 | Growth $3288.00 | Credit Card -$200.34 | Other $5311.00 | Liability $200.34 | Assets $10178.04 |
| Calendar | Account Detail | Recent Activities | Bills | Savings Rules | Alerts |

TotalAvailable Today: $1377.44 (with reserve: $1579.04)

\* Pending $2000.00 until approved transfer

75 — Scheduled Out $687.14 | Free $690.30 — 73

Available: $1377.44   \*  ◀▶   Reserve: $201.60

68 — — 72 — 77 — 70

| Scheduled Out (until Oct. 1st) (Scheduled Bill) | |
|---|---|
| Telephone Scheduled for 9/19/07 | $87.14 |
| Insurance Scheduled for 9/23/07 | $500.00 |
| Transfer (Available to Growth) Scheduled for 9/24/07 | $100.00 |
| | |
| Total Scheduled Out: | $687.14 |

| Reserve | | (Add Item) |
|---|---|---|
| Items you are saving for: | | |
| Phone | $399.00 | $50.00 |
| New Laptop | $999.00 | $30.00 |
| Unallocated | | $121.60 |
| Interest on Reserve YTD (1.1%): $0.30 | | |
| Total Reserve: | | $201.60 |

Transfer Money: From: (Choose Account ▼) To: (Choose Account ▼) Amount: [   ] (Go)

| Future Scheduled Out (after Oct.1) | |
|---|---|
| Electric Scheduled for 10/3/07 | $26.39 |
| Cable Scheduled for 10/10/07 | $83.00 |
| | |
| Total Future Scheduled Out: | $106.39 |

| Scheduled Out (until Oct. 1st) (Schedule Bill) | | Reserve (Add Item) ,70 | |
|---|---|---|---|
| Telephone Scheduled for 9/19/07 | $87.14 | Items you are saving for: | |
| Insurance Scheduled for 9/23/07 | $500.00 | Phone $399.00 New Laptop $999.00 | $50.00 $30.00 |
| Transfer (Available to Growth) Scheduled for 9/24/07 | $100.00 | Unallocated | $121.60 |
| Water Bill Scheduled for 9/24/07 ⚠ | $890.00 | Interest on Reserve YTD (1.1%): $0.30 | |
| Total Scheduled Out: | $1577.44 | Total Reserve: | $201.60 |

74

Transfer Money: From: [Choose Account ▼] To: [Choose Account ▼] Amount: [ ] (Go)

| Future Scheduled Out (after Oct.1) | |
|---|---|
| Electric Scheduled for 10/3/07 | $26.39 |
| Cable Scheduled for 10/10/07 | $83.00 |

FIG. 14

| Pending... | Point of Sale Purchase at... | 🚗 | | $12.34 | $1377.44 | |
|---|---|---|---|---|---|---|
| 09/18/2007 | POS Debit Card Purchase Chicago Ni... | ❓ | | $144.33 | $1389.78 | |
| 09/18/2007 | POS Debit Card at 3626 Halsted... | | | $96.45 | $1534.11 | |
| 09/17/2007 | Savings Rule Transfer ATM w/d 2% | Restaurant / Dining Retail | | $1.60 | $1630.56 | $201.60 |
| 09/17/2007 | Transfer from Growth to Reserve | Services Grocery | | | | $200.00 |
| 09/17/2007 | Authorized Transfer, IDEO Inc. | ATM Entertainment | | | $1632.16 | |
| 09/17/2007 | ATM Withdrawal | Transit / Travel Housing | | $80.00 | $122.16 | |
| 09/16/2007 | Transfer from Reserve to Available | Miscellaneous | | | $202.15 | $100.00 |
| 09/15/2007 | Electric Bill Payment | 📱 | | $17.45 | $2.16 | |
| 09/14/2007 | POS Debit Card at 3626 Halsted... | 🚗 | | $9.17 | $19.61 | |
| 09/11/2007 | Automated balance protection transfer | | $100 | $100 | $28.78 | $300.00 |

FIG. 15

⚠ Alert Controls

| Alert Type | Limit |
|---|---|
| ☑ Balance Threshold | $1,000 |
| ☑ Overdraft | $1,000 |
| ☑ Direct Deposit | $1,000 |
| ☐ Balance Threshold | $500 |
| ☐ Direct Deposit | $500 |
| ☐ Overdraft | $500 |

Back    Switch

FIG. 18

| My Accounts | Transfer Funds | Profile Settings | My Offers | | Sign Off |
|---|---|---|---|---|---|
| My Money $1579.04 | Growth $3288.00 | Credit Card -$200.34 | Other $5311.00 | Liability $200.34 | Assets $10178.04 |
| Calendar | Account Detail | Recent Activities | Bills | Savings Rules | Alerts |

Summary - Active Auto/Alerts      Add New    Profile

| On/Off | Account | Alert Type | Limits | Delivery Address | Delivery Number | |
|---|---|---|---|---|---|---|
| ✓ | xxxx5955 | Balance Threshold | | johndoe@hotmail.com | | Edit |
| ✓ | xxxx5955 | Overdraft | $1,000 | | 777-123-4567 | Edit |
| ✓ | xxxx5955 | Direct Deposit | $1,000 | johndoe@hotmail.com | 777-123-4567 | Edit |

FIG. 19

|  |  |  |
|---|---|---|
| 11 | 12 | 13 |
| $100.00 ⊖ |  |  |
| 18 | 19  $1290.30 | 20  Reminder! ~200 |
| $253.12 ⊖ | $87.14 ⊖ |  |

| Tuesday | Wednesday | | Thursday |
|---|---|---|---|
| 26 | 27 | Total Available: $300.00 ,304 | 28 ,308 |
| | | Total Out: $20.15* | ★ $50.00 Reserve: Mom's Birthday (Edit) |
| | | POS Debit Card Pharmacy $15.00 | |
| | | POS Purchase at 400 North Ave $5.15* | |

FIG. 28

| My Accounts | Transfer & Request | Bill Center | Planning | Customer Service | My Offers |

| Spend/Reserve | Growth | ▶ View All Accounts |

| Quick View | Calendar | Account Detail | Account Activities | Savings Engines | Alerts |

312 ↘    ↙ 310

Available: $300.00     Reserve: $1200.00

Items you've stashed money for: — 314

Scheduled Out   (Add)

Tips of use:
This section will list your bill payments from the day you schedule them until the day the money actually leaves your account.
Schedule your first bill payment here.

300

| Mom's Birthday Event Date: 8/31/08 | $50.00 | (Edit) |
| Buy Books Event Date: 9/02/08 | $500.00 | (Edit) |
| Cellphone Bill Event Date: 10/24/08 | $30.00 | (Edit) |
| MP3 Player | $100.00 | (Edit) |

Unallocated:
Interest on Reserve YTD (1.1%): $0.00        $680.00

Total Scheduled Out:   $0.00           (Add)

316

Transfer: (Between People ▼) From: (Spend ▼) To: (Dad ▼) Amount: $ 50.00 (Go)

FIG. 29

| Available: $300.00 | | | 318 | Reserve: $1200.00 |

Reserve  Add ☒

| Item Description | Event Date | Reminder Date | Amount | |
|---|---|---|---|---|
| Mom's Birthday | 8/31/08 | One Day Ahead | $50.00 | Edit |
| Buy Books | 9 / 01 / 2008 📅 | Day of Event ▼ / One Day Ahead / One Week Ahead | $ 500.00 ⇅ | Save  Delete |
| Cellphone Bill | 10/24/08 | | $30.00 | Edit |
| MP3Player | Set Event Date | | $ 100.00 ⇅ | Save  Delete |

Unallocated:
Interest on Reserve YTD (1.1%): $0.00                                   $520.00

Total Reserve:                                                          $1200.00

FIG. 30

| Available: $300.00 | Reserve: $1200.00 |

Do you want to add a stash Item?

Item Description: | Buy Books |

Event Date: 9 / 24 / 2008 📅

Reminder Date: | Day of Event ▼ |

Amount: $ 500.00 ⇅

Save   Cancel
                    ─319

FIG. 31

SYSTEMS AND METHODS FOR ENABLING FINANCIAL SAVINGS

CROSS REFERENCE TO RELATED APPLICATIONS

The present application claims priority to U.S. Provisional Patent Application No. 61/065,134 filed on Feb. 8, 2008, U.S. Provisional Patent Application No. 61/027,946 filed on Feb. 12, 2008, and U.S. Provisional Patent Application No. 61/073,851 filed on Jun. 19, 2008.

BACKGROUND

Customers of financial institutions generally utilize a checking account as their central account for both discretionary spending and fixed expenses, such as bills and rent or mortgage payments. Such customers may tend to associate scheduled bill payments with certain monthly pay periods. However, existing online or electronic banking systems do not allow for customers to analyze and understand how different actions relating to their finances, including scheduled bill payments and pay periods, can affect their financial position.

SUMMARY

In one general aspect, embodiments of the present invention are directed to systems and methods that present, in a calendar format, pending, posted and historical transactions and, using scheduled bill payments, transfers and manually entered information and assessments of the future financial health of a customer of a financial institution. Embodiments of the present invention allow customers to understand cycles of income and bill responsibilities, and give the customers the ability to coordinate transfers and bill payments to help assist the customer in maintaining healthy and stable account balances.

In various embodiments, the present invention is directed to a computer-assisted method for facilitating financial savings. The method includes accepting a funds transfer request by a user of an amount of funds between a funding account and at least one receiving account and accepting, from the user, a designation of an intended purpose of use of the amount of funds and a date of intended use of the amount of funds. The method also includes transferring the amount of funds from the funding account to the at least one receiving account and generating, for display on a graphical banking interface, a graphical representation of the designation of the intended purpose of use of the amount of funds. The method further includes transferring the amount of funds from the at least one receiving account to the funding account on the date of intended use.

Those and other details, objects, and advantages of the present invention will become better understood or apparent from the following description and drawings showing embodiments thereof.

BRIEF DESCRIPTION OF THE DRAWINGS

Various embodiments of the present invention are described herein by way of example in conjunction with the following figures, wherein:

FIGS. 2 through 7 illustrate screen shots of an online or electronic banking interface according to various embodiments of the present invention;

FIGS. 7A through 7D illustrate screen shots of an online or electronic banking interface according to various embodiments of the present invention;

FIGS. 8 through 24 illustrate screen shots of an online or electronic banking interface according to various embodiments of the present invention;

FIGS. 26 through 31 illustrate screen shots of an online or electronic banking interface according to various embodiments of the present invention.

DESCRIPTION

Various embodiments of the present invention are directed to systems and methods that provide electronic banking tools and interfaces. The systems and methods, in various embodiments, allow users to change payment dates of bills by way of graphical operation (e.g., by "dragging" and "dropping" a scheduled payment). Various embodiments alert a user when an available account balance drops below a certain threshold. Various embodiments allow for real time population of payment items on a calendar and allow for daily, weekly, monthly and yearly calendar views of past and future account activity. As used herein, the terms "account" or "bank account" mean any type of account that is held, administered or offered by a bank or financial institution, or any type of account that is held, administered or offered by an entity that is external to the bank or financial institution.

Figure 1:
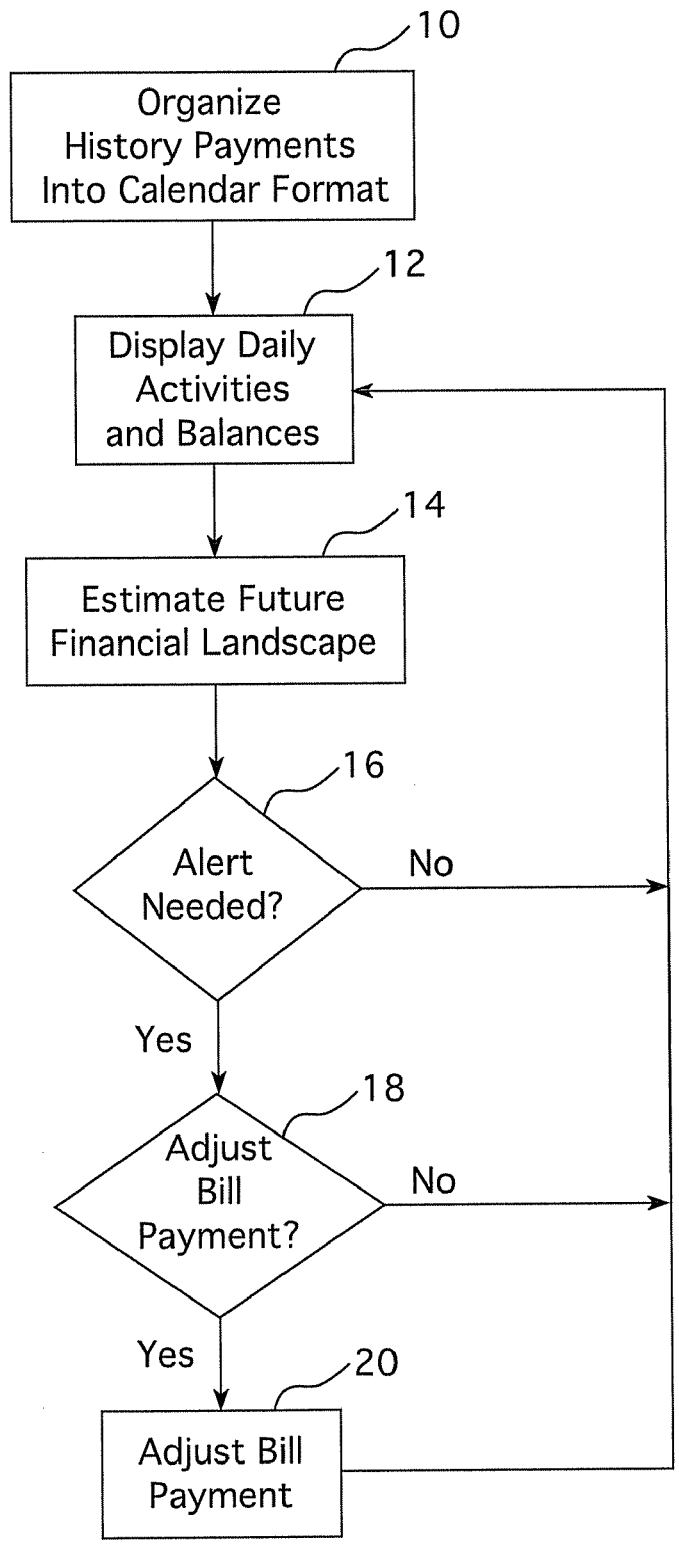
FIG. 1 illustrates a flowchart of an embodiment of a method for scheduling and tracking bank account activity.

FIG. 1 illustrates a flowchart of an embodiment of a method for scheduling and tracking bank account activity. At step 10, account history and upcoming payments for a customer account are organized into a calendar format. The data that are used to populate the calendar may be obtained, in various embodiments, from sources that are administered or owned by the financial services entity that administers the bank account or from sources that are external to the financial services entity that administers the bank account. The sources of data may relate to any type of account or events that relate to any type of account or information source. In such embodiments, the calendar provides a unitary display of all accounts, including accounts for which billing events are relevant (e.g., an account or service for which electronic bill paying is utilized) and information sources for which the user, or bank account holder, desires to track activity or view events. The data that are used to populate the calendar may be obtained by entry of the data by the user (i.e., by manual entry). In one embodiment, the data that are used to populate the calendar may be obtained directly from sources that are external to the financial services entity that administers the bank account.

In one embodiment, data may be obtained from sources that are administered or owned by the financial services entity that administers the bank account and pre-populate the calendar, thus saving the user the time necessary to manually populate the calendar. For example, in the case when the financial services entity is a bank, the data could include any account or other product of the user of the calendar, one or more demand deposit accounts (DDA), information relating to credit cards (e.g., payment due dates, account balance, balance due, etc.), information relating to loan payments (e.g., mortgages, student loans, home equity loans and lines of credit, etc.), investment vehicles (e.g., scheduled recurring investments, dates for certificate of deposit (CD) maturity, etc.), and information relating to small business and other commercial accounts. By way of example, the financial services entity may present an entry on the calendar that alerts the user that a bank event is going to occur on a certain date. For example, the bank event may be a lowering of the interest rate that is scheduled to occur at a later date for the user's adjustable rate mortgage for which the financial services entity is the lender or administrator.

In various embodiments, the calendar is automatically populated with electronic transactions such as automated clearing house (ACH) direct deposits, account debits, peer to peer (P2P) payments, and funds transfers to accounts that are external to the user's account, so that the user may view due dates, amounts, etc. of such deposits and debits.

At step 12, daily activities and balances are displayed on a device such as, for example, a personal computer, a laptop or portable computer or a mobile device such as a PDA, mobile phone, Blackberry® device, etc. In various embodiments, calendar entries may be displayed in summary form and data that appears on the calendar may be displayed in summary form. For example, total monthly bills, total transfers, number of checks used, etc. may be displayed in summary form. In various embodiments, the user has the ability to filter the calendar view and narrow the scope of the information that is displayed on the calendar. For example, the user may have the ability to filter the display based on account type, calendar type, account activity, relationship, etc. In various embodiments, the user can toggle between calendar views. Such toggling may be desirable when, for example, the user has multiple calendars for multiple accounts or account types and wishes to toggle between the calendars, when the user shares one or more calendars with another user, in addition to having the user's own (non-shared) calendar, and wishes to toggle between such calendars, when the user desires to toggle between different types of calendars (e.g., a social calendar and a financial calendar), etc.

At step 14, the future financial landscape for the customer is estimated based on past account history. In various embodiments, a future cash flow/balance projection is performed at step 14. At step 16, the process determines whether there are any anticipated trouble spots (e.g., events that may trigger a negative account balance or negative cash flow). If so, the customer is prompted at step 18 as to whether the customer would like to adjust any scheduled electronic or online bill payments. If so, at step 20 one or more bill payments are rescheduled or altered. An example of an anticipated trouble spot is when there is one or more outstanding debits on the account and it is determined, based on past spending and debit behavior, that one or more of the outstanding debits will result in a negative account balance.

In various embodiments, the user may search, by selecting, for example, a search icon, the calendar so that the user can find specific activities, data, etc. that is stored in connection with or constitutes an entry in the calendar.

FIG. 2 illustrates a screen shot of an online or electronic banking interface according to various embodiments of the present invention. The screen shot of FIG. 2 is presented when a user initiates a banking session for the first time. As can be seen in FIG. 2, a window 30 is presented in which the user is asked to enter information relating to the user's paydays or other scheduled recurring deposits. The payday information is populated in a calendar 32 and a window 34 describes information relating to bill scheduling. A money bar graphic 36 lists an available and reserve amount of money and windows 38 and 40 describe the money bar graphic 36.

FIG. 3 illustrates a screen shot of an online or electronic banking interface according to various embodiments of the present invention, when the calendar 32 is starting to be populated with historical data. A debit card transaction 42 is illustrated in the calendar 32 and a recent activity graphic 44 shows ongoing expenses and deposits. A recent activity list 46 provides a description of each transaction relating to the account.

Figure 4:
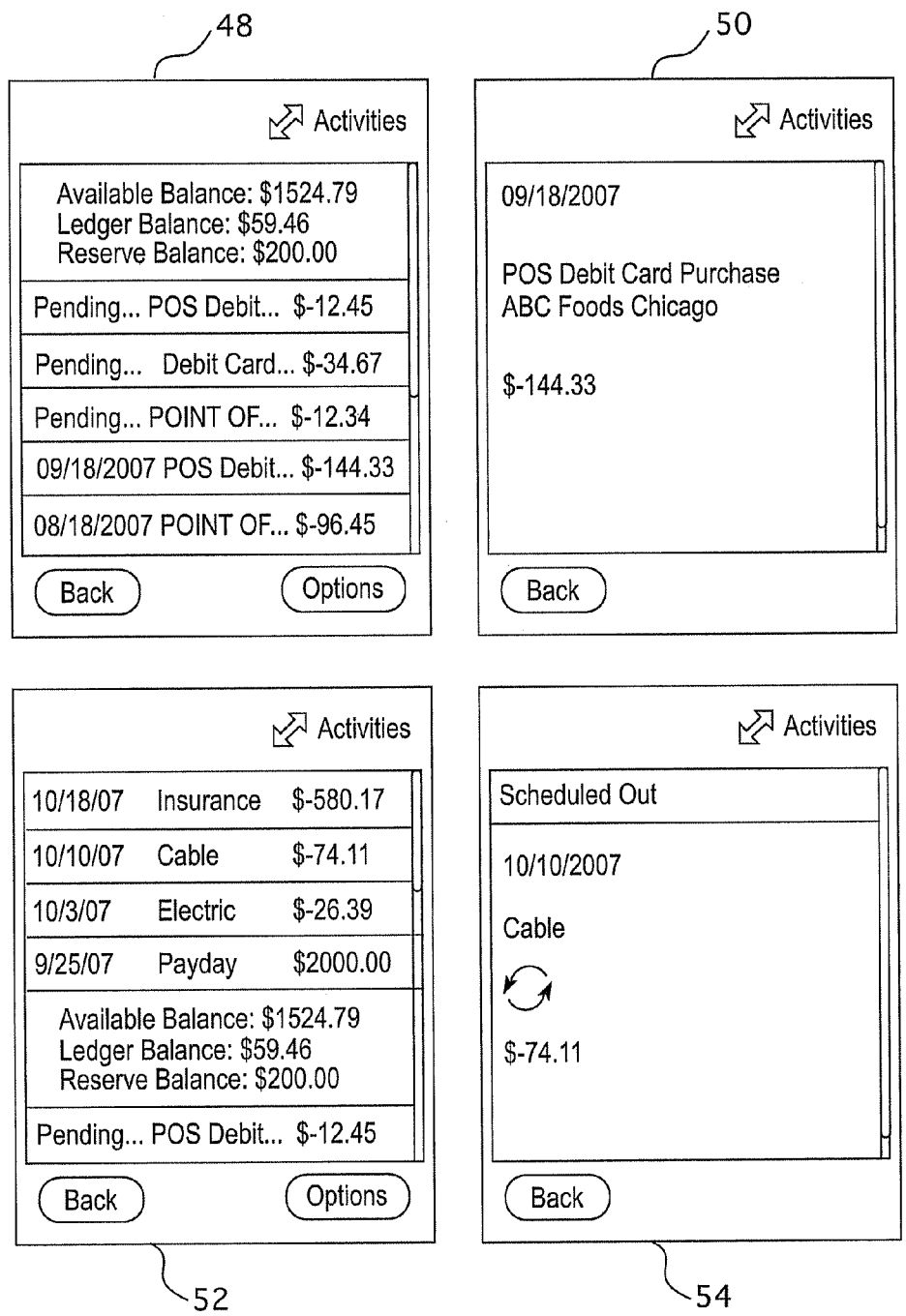

FIG. 4 illustrates screen shots of an online or electronic banking interface according to various embodiments of the present invention, in which account activities are displayed. A window 48 shows account balances and pending and historical transactions. A window 50 detailing a transaction results when a transaction from the window 48 is selected. A window 52 details pending transactions and a window 54 detailing a future transaction results when a transaction from the window 52 is selected.

Figure 6:
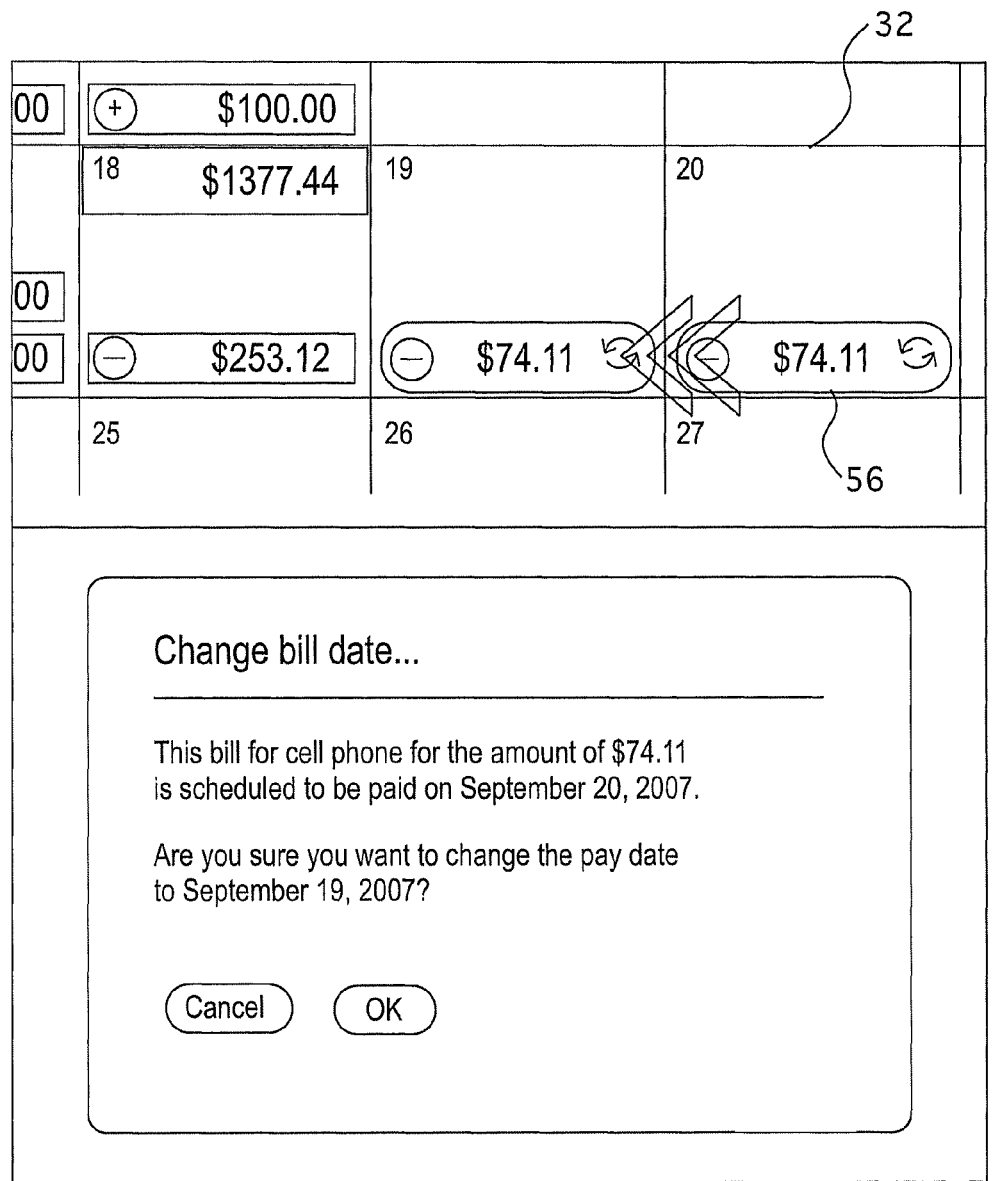

FIG. 5 illustrates a screen shot of an online or electronic banking interface according to various embodiments of the present invention. The calendar 32 is illustrated in a monthly view in FIG. 5. FIG. 6 illustrates screen shots of an online or electronic banking interface according to various embodiments of the present invention, in which a date for a bill is changed. As can be seen in FIG. 6, a scheduled item 56 is moved to an adjacent day by selecting the item 56 and "dragging" it into the adjacent day. A window 58 requires the user to confirm movement of the item 56.

FIG. 7 illustrates a screen shot of an online or electronic banking interface according to various embodiments of the present invention. FIG. 7 shows the calendar 32 in a monthly view that illustrates examples of a scheduled payday 60 and a scheduled bill 62. When a Schedule Bill tab 64 is selected, a window 66 is displayed in which reminders of bills can be added and bill payment information may be entered. In various embodiments, outstanding paper check debits that have not been debited to the account are deducted from the account balance so that the account balance more accurately reflects the balance of the account. To record a paper check debit, a user may select the Schedule Bill tab 64 and select a "Paper Check" option in a dialogue box (not shown). The screen of FIG. 7A results and the user may enter information relating to the paper check. As shown in FIG. 7B, the user may select a "My Check List" tab (not shown) to obtain a list of outstanding paper checks that have been written. As shown in FIG. 7B, check entries may also be added or deleted. FIG. 7C illustrates a screen shot of a portion of the calendar 32 in a monthly view. As shown in FIG. 7C, the paper check that was entered is entered onto the calendar on the day it was written. As shown in FIG. 7D, when the paper check clears, the entry of FIG. 7C is removed from the calendar 32 and an entry is added to the calendar 32 on the day the check cleared.

An alert 68 is displayed when the current, scheduled account activities are forecast to exceed the available account balance within a current pay period. The alert 68 may be displayed in a color that will get the attention of the user such as red. In various embodiments, the alert 68 may be communicated to the user via, for example, an email, an SMS message, a message that is displayed to the user when the user uses an automated teller machine (ATM), etc.

Figure 8:
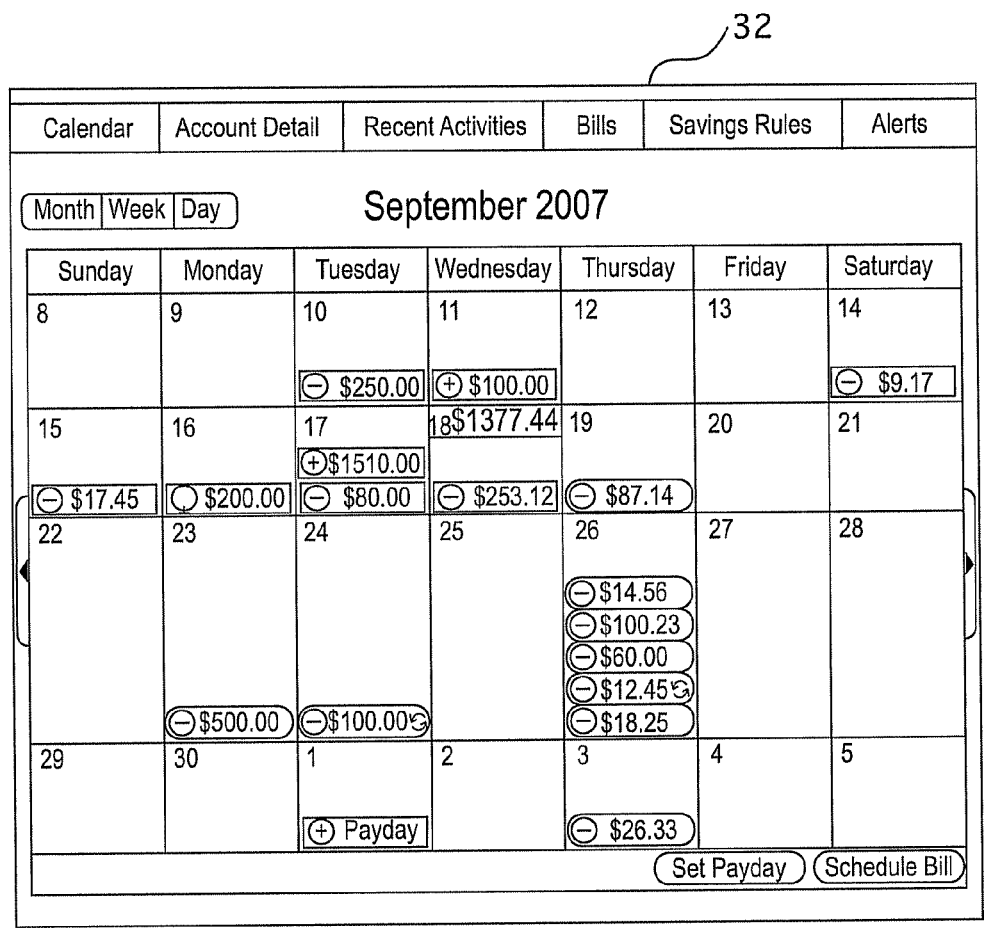

FIG. 8 illustrates a screen shot of an online or electronic banking interface according to various embodiments of the present invention. The calendar 32 of FIG. 8 illustrates the case when a large number of transactions are scheduled on a particular day (September $26^{th}$) and the size of the blocks for each day of that week is expanded. FIG. 9 illustrates a screen shot of an online or electronic banking interface according to various embodiments of the present invention. In FIG. 9, the calendar 32 is shown in a weekly view. FIG. 10 illustrates a screen shot of an online or electronic banking interface according to various embodiments of the present invention. In FIG. 10, the calendar 32 is shown in a daily view.

FIG. 11 illustrates a screen shot of an online or electronic banking interface according to various embodiments of the present invention. The screen shot of FIG. 11 illustrates an account detail page in which an actual amount 68 that a user can access is displayed on a graphic 72. The account detail page also illustrates a reserve balance 70 that can be allocated to define savings goals. The account detail page allows for a user to move money between a reserve account and the account that contains the available balance using a graphic 77. In various embodiments, when a check deposit is pending, the value of the deposit is not added to the available balance, and a message is displayed. A free total graphic 73 displays the difference between the available balance and the scheduled out amount 75. The scheduled out amount 75 represents payments that are scheduled before the next payday. Payments scheduled after the next payday are listed in a window 76.

Figure 12:
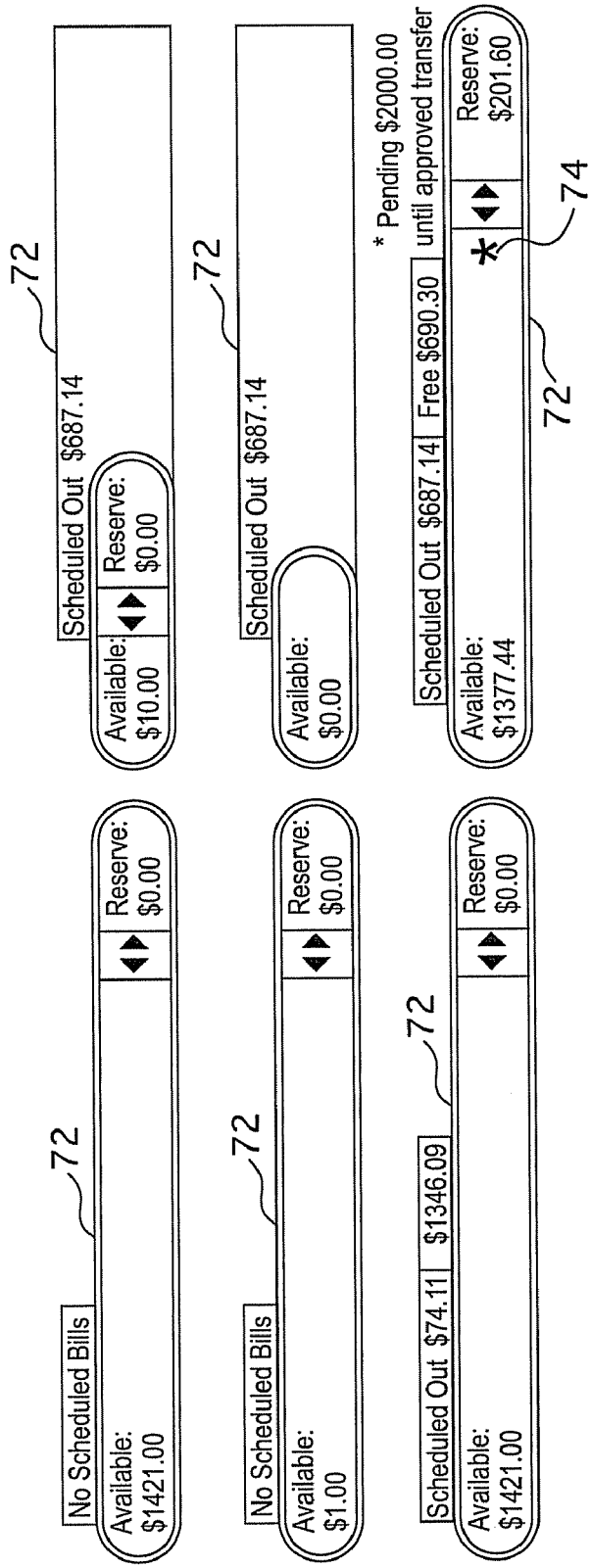

FIG. 12 illustrates screen shots of an online or electronic banking interface according to various embodiments of the present invention. As shown in FIG. 12, the graphic 72 illustrates, in various embodiments, the relative proportion of a balance of the reserve account and a balance of the account that contains the available balance. Scheduled bills are illustrated in proportion with the account balances. A graphic 74 indicates a pending deposit.

Figure 13:
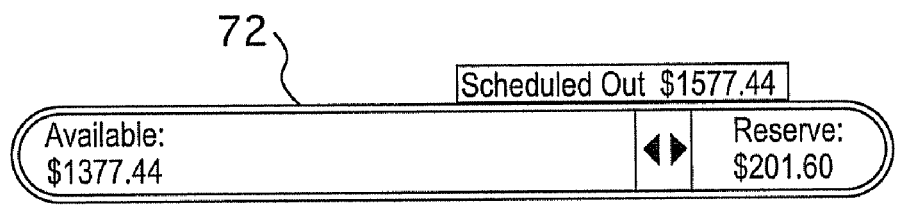

FIG. 13 illustrates a screen shot of an online or electronic banking interface according to various embodiments of the present invention. As can be seen in FIG. 13, the graphic 72 illustrates a case when scheduled payments are greater than the available account balance for a current pay period. Such a situation triggers an alert that is displayed to the user. As shown in FIG. 14, a graphic 74 is displayed in connection with the scheduled payment that causes the available balance to be a negative value.

FIG. 15 illustrates a screen shot of an online or electronic banking interface according to various embodiments of the present invention. As can be seen in FIG. 15, a user can reassign a transaction to a different category when desirable.

Figure 16:
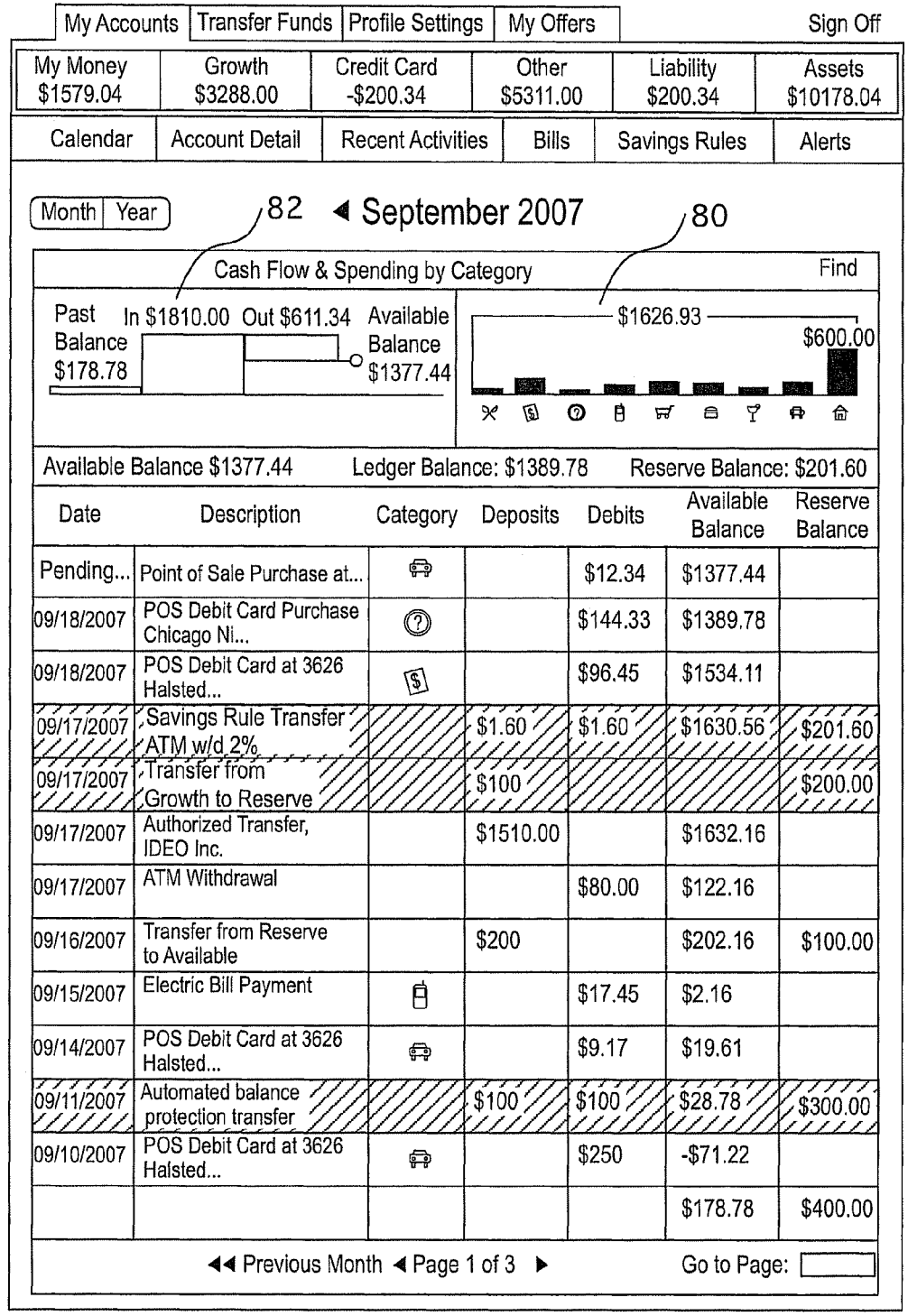

FIG. 16 illustrates a screen shot of an online or electronic banking interface according to various embodiments of the present invention. The screen in FIG. 16 is a screen showing recent activities for a month. A graphic 80 illustrates a distribution of expenses by category. A cash flow graphic 82 illustrates a comparison of incoming and outgoing cash flow during a month. In one embodiment, the graphic 82 resets at the beginning of each month.

Figure 17:
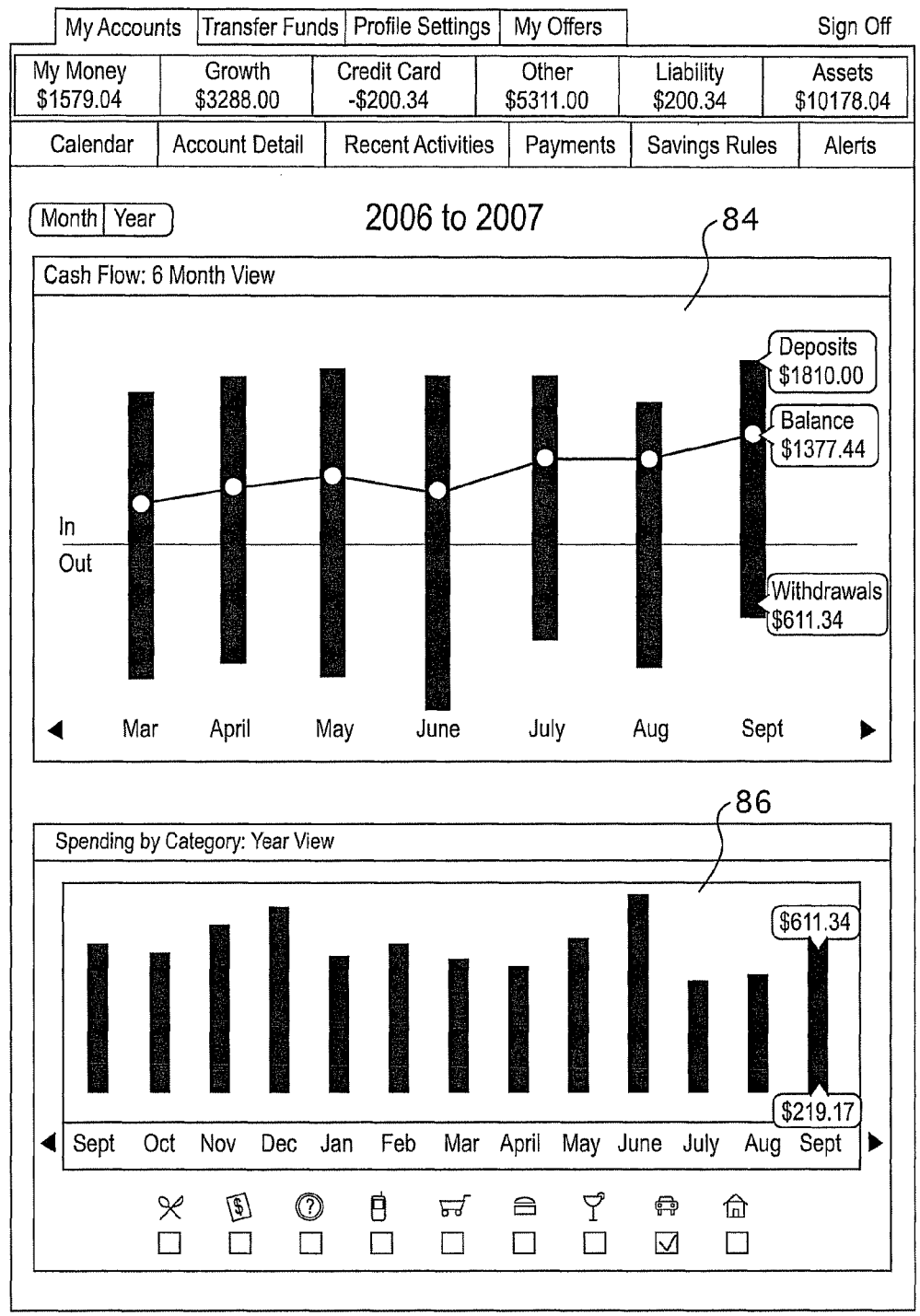

FIG. 17 illustrates a screen shot of an online or electronic banking interface according to various embodiments of the present invention. Windows 84 and 86 show a yearly view of cash flow and provide a simultaneous view of spending and monthly income trends over time. In one embodiment, the window 84 uses a relative scale in which the highest value defines the highest bar and the other bars are proportionally scaled. In one embodiment, the window 86 displays expenses by category and total money spent over, for example, the last 12 months.

FIG. 18 illustrates a screen shot of an online or electronic banking interface according to various embodiments of the present invention. The screen shot illustrated in FIG. 18 provides a list of alerts that may be toggled on or off. FIG. 19 illustrates a screen shot of an online or electronic banking interface according to various embodiments of the present invention. The screen of FIG. 19 is used to specify the parameters for which alerts are delivered to a user. Alerts can be delivered to, for example, an email address, a destination for a text message, a phone number, etc., or the alert may be displayed to the user when the user engages in an automated teller machine (ATM) session.

Figure 20:
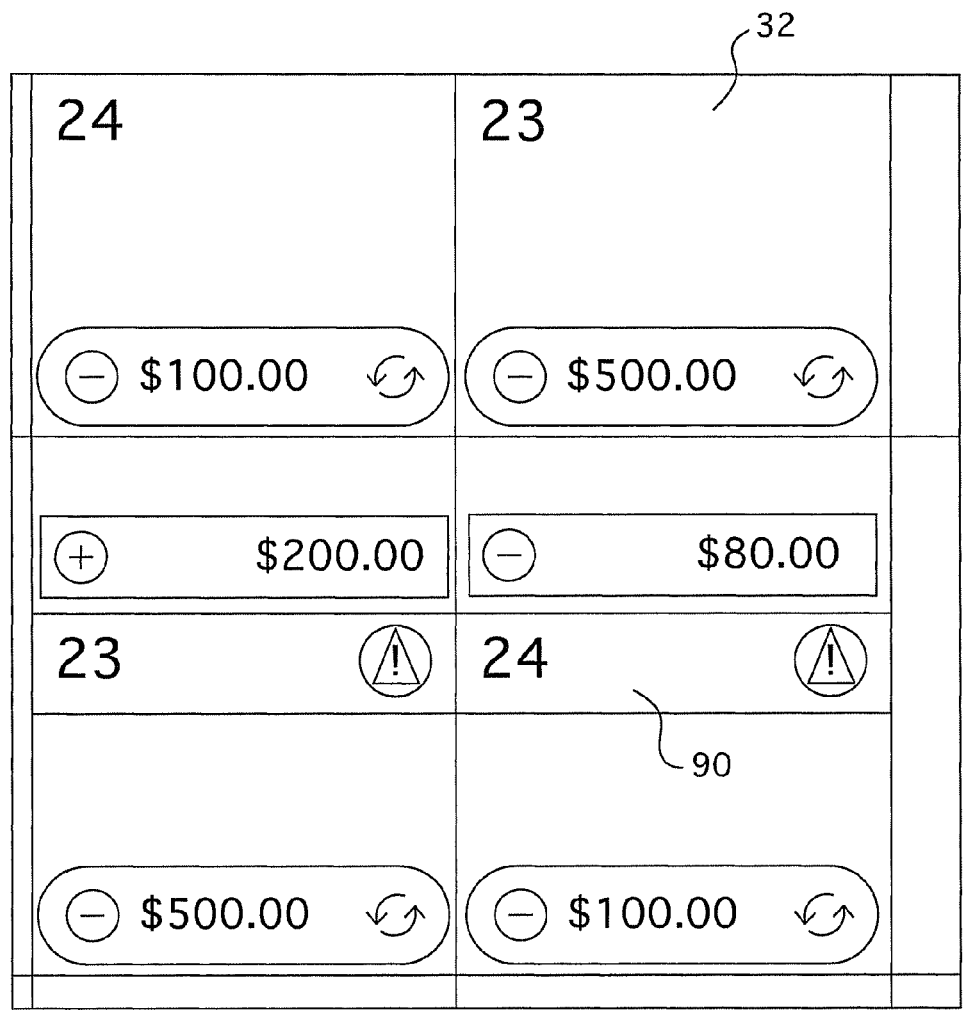
Figure 21:
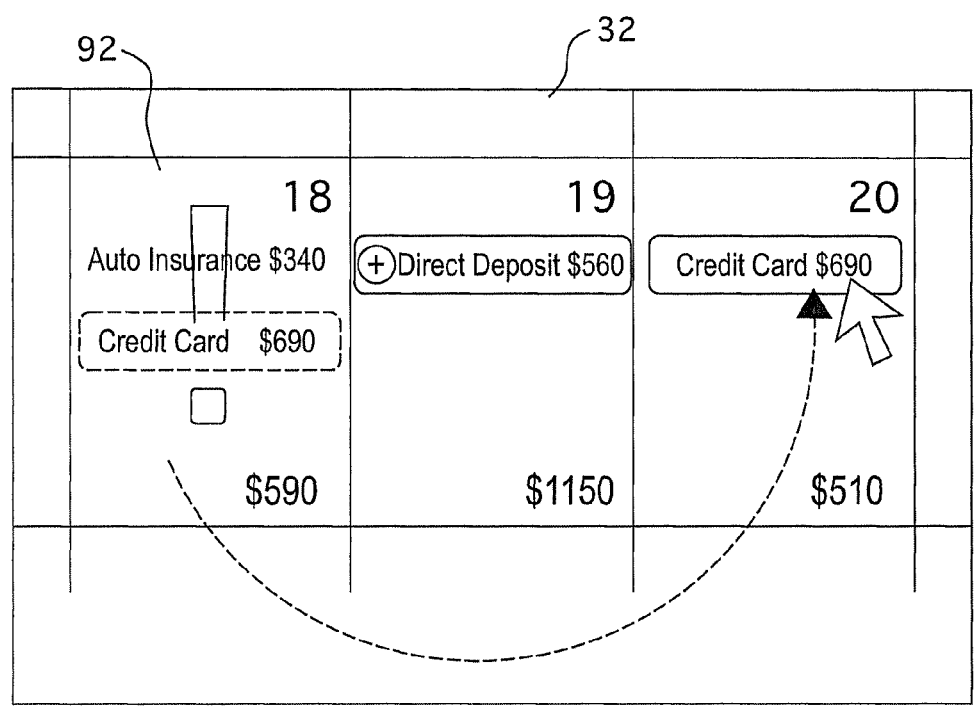

FIG. 20 illustrates a screen shot of an online or electronic banking interface according to various embodiments of the present invention. As illustrated in FIG. 20, a graphic 90 is displayed on the calendar 32 when the scheduled bills exceed the available balance. FIG. 21 illustrates a screen shot of an online or electronic banking interface according to various embodiments of the present invention. In FIG. 21, an alert 92 is shown on the calendar 32 because a scheduled bill exceeds the available balance. A more opportune bill payment schedule is recommended and displayed to the user so that the user can optimize the user's finances.

Figure 22:
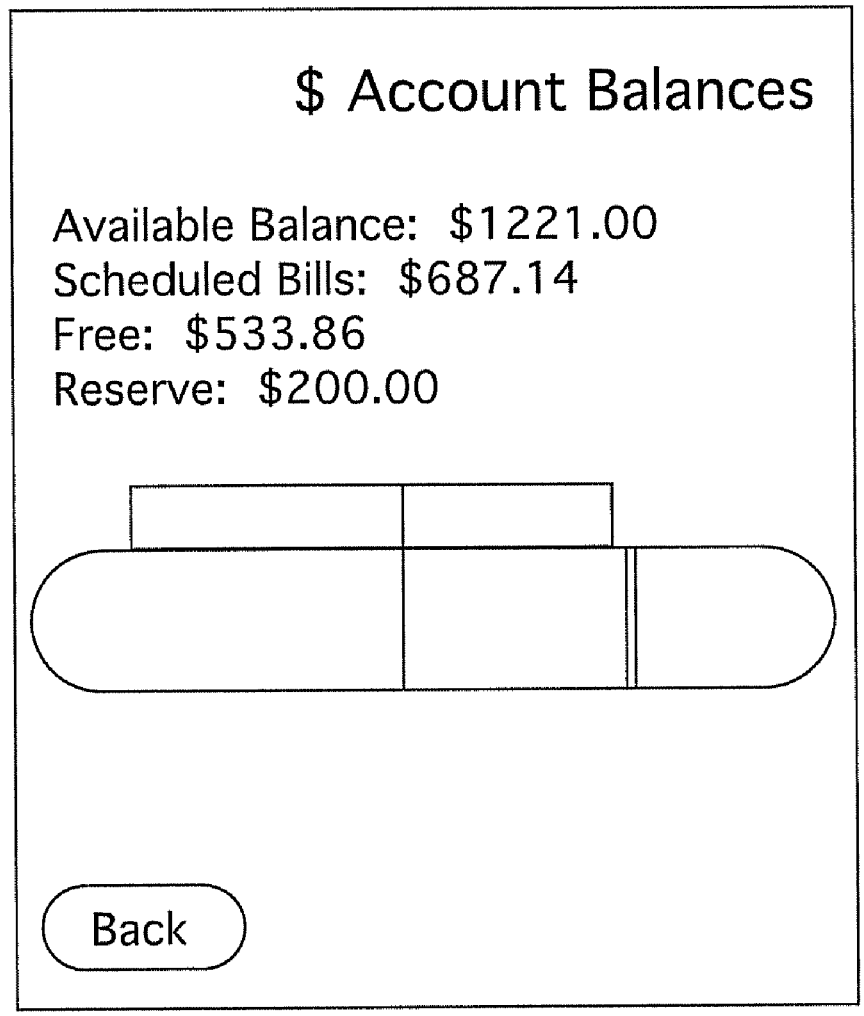

FIG. 22 illustrates a screen shot of an online or electronic banking interface according to various embodiments of the present invention. The screen shot of FIG. 22 is a screen that may be displayed on a mobile device that allows an overview of the user's account information.

FIG. 23 illustrates a screen shot of an online or electronic banking interface according to various embodiments of the present invention. As shown in FIG. 23, a reminder graphic 200 is presented on the calendar 32. The graphic 200 may be displayed in response to a request by the user that a reminder be added for the user's benefit to the calendar 32. The reminder for which the graphic 200 is displayed may be related to a financial or non-financial event. As an example, a user may add a reminder that the user would like to withdraw $200.00 for a dinner event on the day prior to the dinner event. The reminder graphic 200 would be displayed on the calendar 32 when the user logs into the electronic or online banking system on the day of the reminder.

Figure 24:
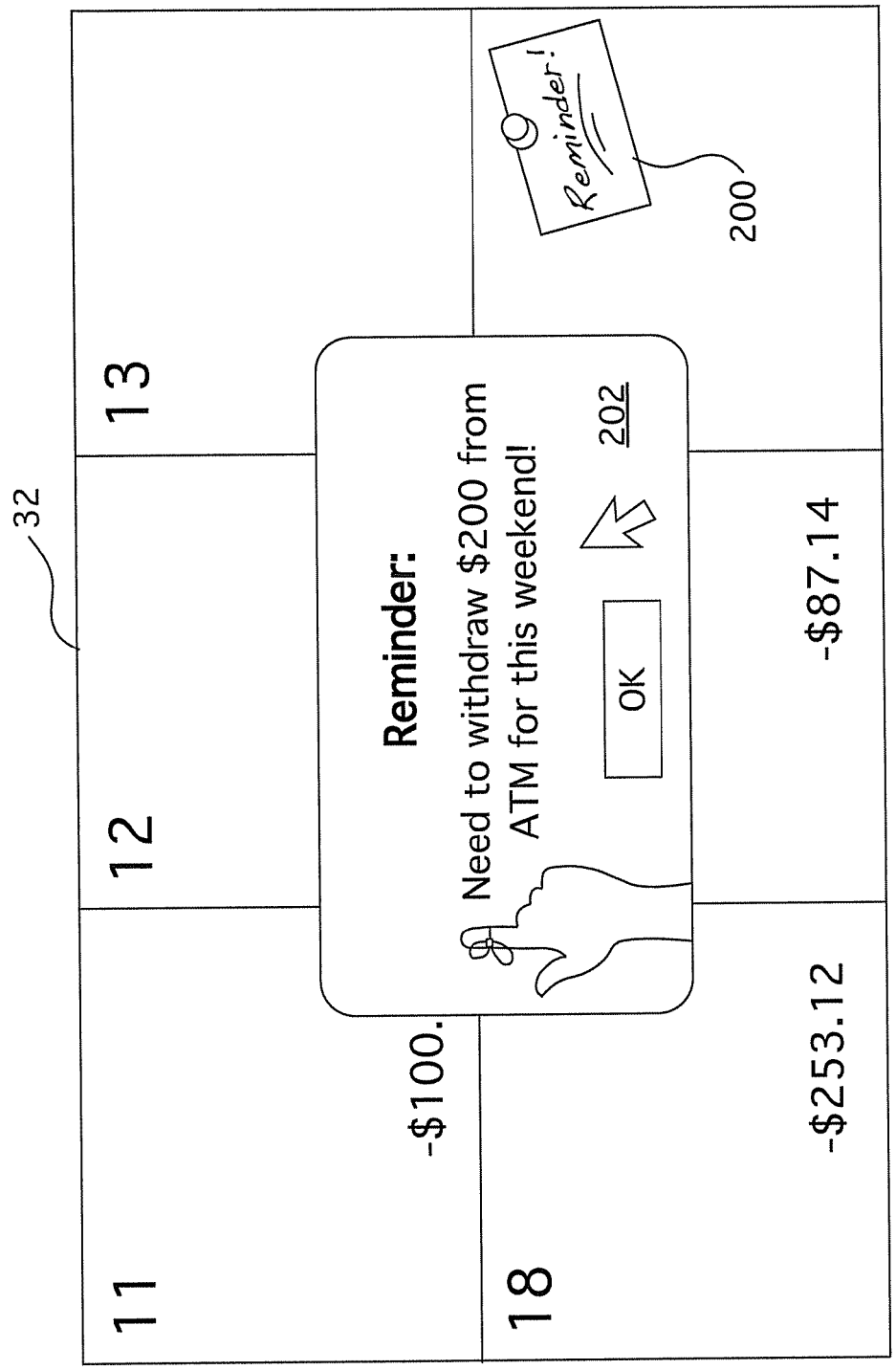

FIG. 24 illustrates a screen shot of an online or electronic banking interface according to various embodiments of the present invention. As shown in FIG. 24, when the user selects or moves a cursor over the reminder graphic 200, a window 202 appears that shows the details of the reminder. In various embodiments, the window 202 appears automatically and with no action by the user (e.g., when the user logs into the system on the day of the reminder).

Figure 25:
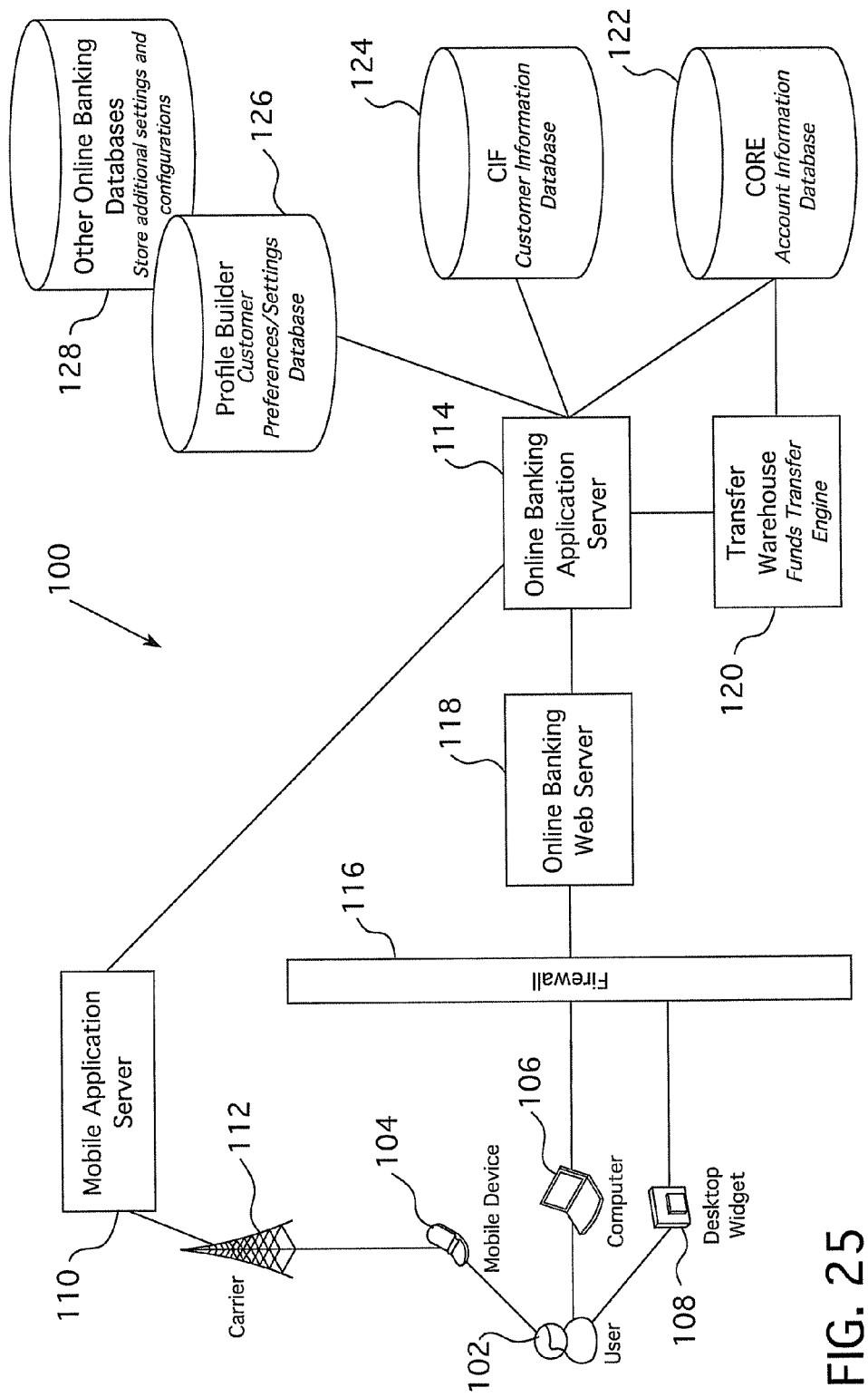
FIG. 25 illustrates an embodiment of a system in which embodiments of the present invention may be used.

FIG. 25 illustrates an embodiment of a system 100 in which embodiments of the present invention may be used. A user 102 may utilize a mobile device 104, a computer 106, a desktop widget 108, or any other suitable device. The mobile device 104 accesses, via a mobile application server 110 and a wireless carrier 112, an online banking application server 114. The online banking application server 114 may perform some or all of the steps of the funds transfer methods as described in various embodiments herein. The computer 106 and the desktop widget 108 access the online banking application server 114 via a firewall 116 protected online banking web server 118.

The online banking application server 114 is in communication with a transfer warehouse (funds transfer engine) 120, an account information database 122, a customer information database 124, a customer preferences/settings database 126, and other online banking databases 128 that store additional settings and configurations.

Figure 26:
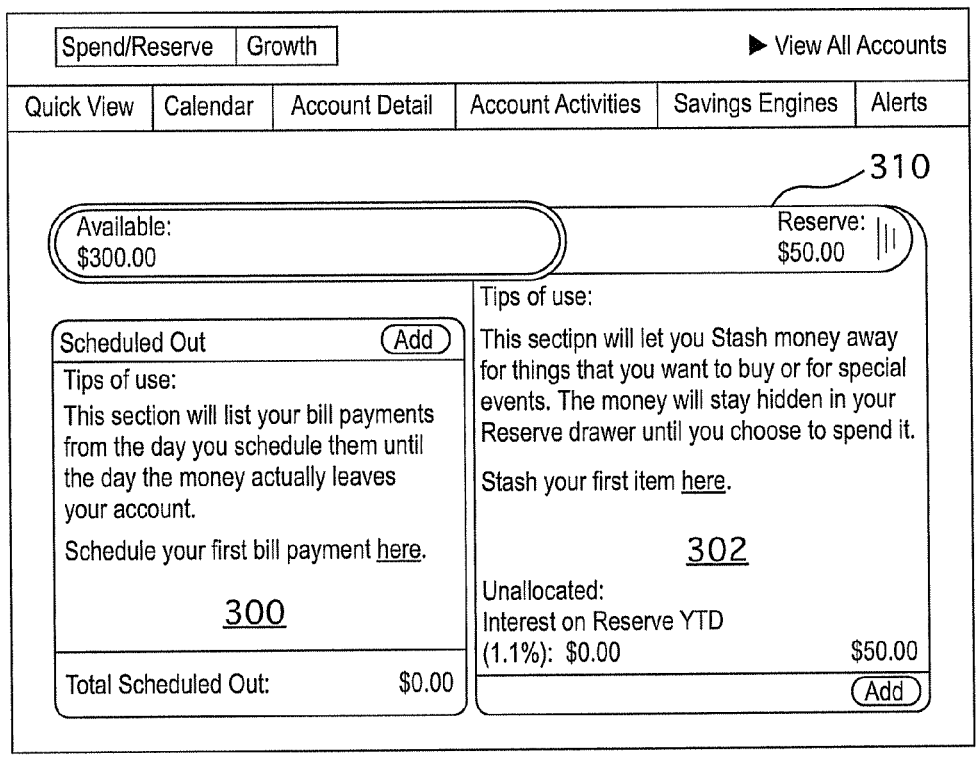

FIG. 26 illustrates a screen shot of an online or electronic banking interface according to various embodiments of the present invention. The screen shot of FIG. 26 shows a window 300 that provides guidance to a user regarding bill payment options. A window 302 provides guidance to the user regarding the ability of the user to designate funds that are added to the reserve balance and that are tagged, or identified, as being designated for a particular purpose. In various embodiments, the amounts that are designated for a particular purpose are not shown to the user until the user desires to spend such amounts. In various embodiments, the screen 302 appears when a user has not designated funds to be saved for a particular purpose.

Figure 27:
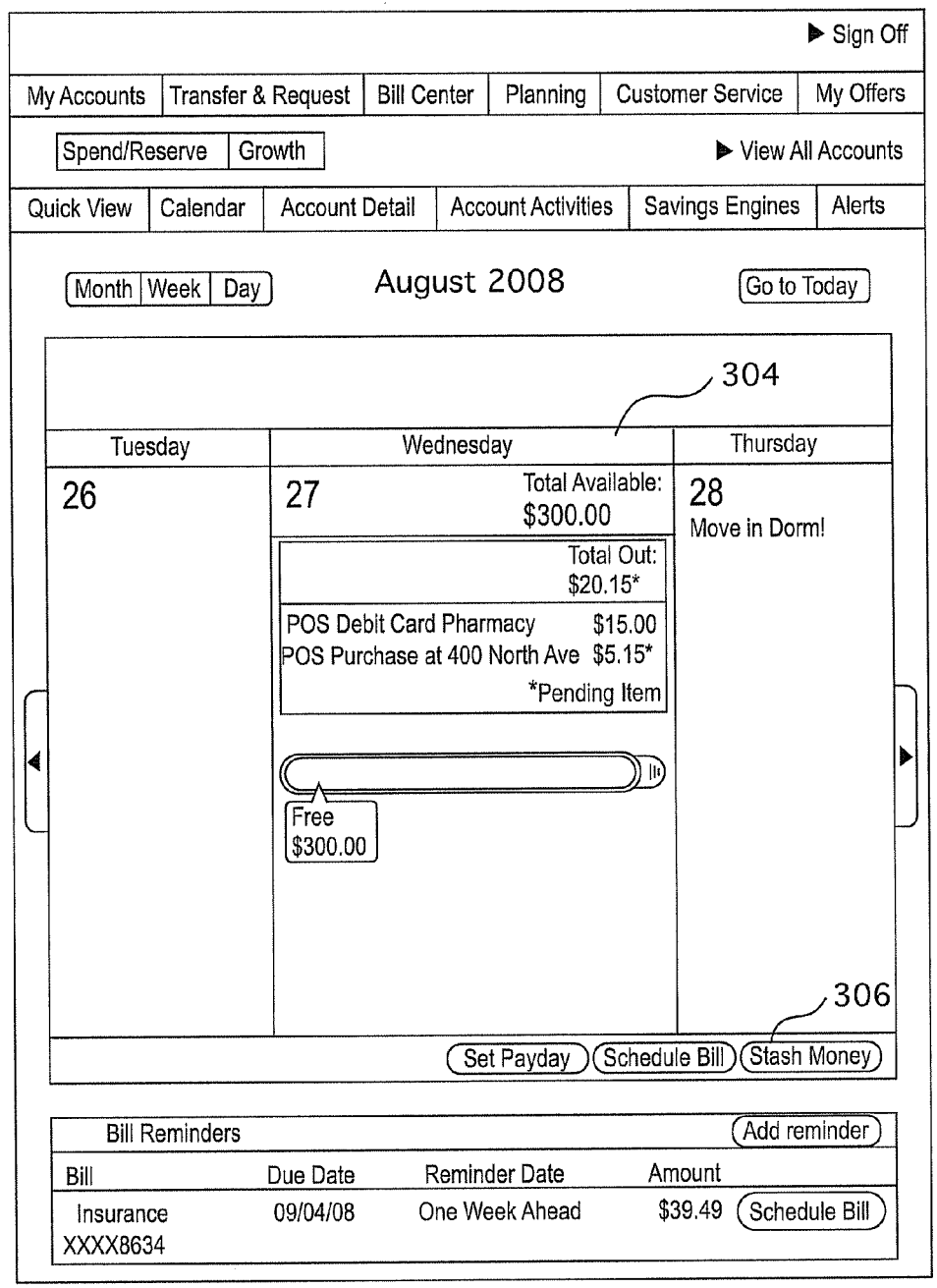

FIG. 27 illustrates a screen shot of an online or electronic banking interface according to various embodiments of the present invention. In FIG. 27, a day view of a calendar 304 is presented that includes a "Stash Money" tab 306 that may be selected to manage funds that have been or will be designated for a particular purpose.

FIG. 28 illustrates a screen shot of an online or electronic banking interface according to various embodiments of the present invention. FIG. 28 illustrates a portion of the calendar 304 in a day view. A graphic 308 indicates an amount that has been designated, in a reserve account, for a particular purpose. In the example illustrated in FIG. 28, the purpose for which the amount of funds has been designated is the birthday of a family member.

FIG. 29 illustrates a screen shot of an online or electronic banking interface according to various embodiments of the present invention. As illustrated in FIG. 29, when a user selects a "Reserve" tab 310 (see FIG. 26), a list 312 of items for which the user has designated an amount to be saved appears.

FIG. 30 illustrates a screen shot of an online or electronic banking interface according to various embodiments of the present invention. The screen in FIG. 30 results when a user selects an "Edit" tab 314 in FIG. 29. In the embodiment illustrated in FIG. 30, the user can edit a description of the item for which funds are designated, a date of the designated event, a reminder date and a monetary amount of the designated amount.

FIG. 31 illustrates a screen shot of an online or electronic banking interface according to various embodiments of the present invention. The screen in FIG. 31 results when a user selects an "Add" tab 316 in FIG. 29 or 318 in FIG. 30. In the embodiment illustrated in FIG. 31, the user can add an item for which funds are designated. After the item is added, the user can select a "Save" tab 319, which will cause the item to be displayed on the calendar 304.

It can be understood that the various electronic banking interfaces described herein may be implemented as, for example, a dynamic HTML Web page that may be one of a plurality of linked screens and that may include various graphic and text features designed to efficiently communicate information regarding aspects of a customer's finances.

Various embodiments of the present invention may be implemented on computer-readable media. The terms "computer-readable medium" and "computer-readable media" in the plural as used herein may include, for example, magnetic and optical memory devices such as diskettes, compact discs of both read-only and writeable varieties, optical disk drives, hard disk drives, etc. A computer-readable medium may also include memory storage that can be physical, virtual, permanent, temporary, semi-permanent and/or semi-temporary. A computer-readable medium may further include one or more data signals transmitted on one or more carrier waves.

While several embodiments of the invention have been described, it should be apparent that various modifications, alterations and adaptations to those embodiments may occur to persons skilled in the art with the attainment of some or all of the advantages of the present invention. It is therefore intended to cover all such modifications, alterations and adaptations without departing from the scope and spirit of the present invention.

What is claimed is:

1. A computer-assisted method for facilitating financial savings, the method comprising:
    accepting, using a processor, a funds transfer request by a user of an amount of funds between a funding account and at least one receiving account, wherein the funding account and the receiving account are separate accounts;
    accepting, from the user, using the processor, a designation of an intended purpose of use of the amount of funds and a date of intended use of the amount of funds;
    transferring the amount of funds from the funding account to the at least one receiving account;
    generating, using the processor, for display on a graphical banking interface, a graphical representation of the designation of the intended purpose of use of the amount of funds; and
    transferring the amount of funds from the at least one receiving account to the funding account on the date of intended use.

2. The method of claim 1, further comprising displaying the graphical representation of the designation on an electronic calendar.

3. The method of claim 1, wherein the at least one receiving account comprises a reserve account.

4. The method of claim 1, further comprising ensuring sufficient funds are available in the funding account prior to transferring.

5. A system for facilitating transfers between financial accounts, the system comprising:
    an interface to a network-enabled client device, wherein the client device includes a display having a user interface; and
    a processor configured to:
    accept a funds transfer request by a user of an amount of funds between a funding account and at least one receiving account, wherein the funding account and the receiving account are separate accounts;
    accept, from the user, a designation of an intended purpose of use of the amount of funds and a date of intended use of the amount of funds;
    transfer the amount of funds from the funding account to the at least one receiving account;
    generate, for display on the user interface, a graphical representation of the designation of the intended purpose of use of the amount of funds; and
    transfer the amount of funds from the at least one receiving account to the funding account on the date of intended use.

6. The system of claim 5, wherein the processor is further configured to cause the graphical representation of the designation to display on an electronic calendar.

7. The system of claim 5, wherein the processor is further configured to ensure that sufficient funds are available in the funding account prior to transferring.

8. An apparatus for facilitating financial savings, the apparatus comprising:
    means for accepting a funds transfer request by a user of an amount of funds between a funding account and at least one receiving account, wherein the funding account and the receiving account are separate accounts;
    means for accepting, from the user, a designation of an intended purpose of use of the amount of funds and a date of intended use of the amount of funds;
    a server having a processor, the server configured to transfer the amount of funds from the funding account to the at least one receiving account;

means for generating, for display on a graphical banking interface, a graphical representation of the designation of the intended purpose of use of the amount of funds; and wherein the server is further configured to transfer amount of funds from the at least one receiving account to the funding account on the date of intended use.

9. The apparatus of claim 8, further comprising means for displaying the graphical representation of the designation on an electronic calendar on or after the date of intended use of the amount of funds.

10. The apparatus of claim 8, wherein the at least one receiving account comprises a reserve account.

11. The apparatus of claim 8, further comprising means for ensuring sufficient funds are available in the funding account prior to transferring.

12. A computer-assisted method for facilitating financial savings, the method comprising:

accepting, using a processor, a funds transfer request by a user of an amount of funds between a funding account and at least one receiving account, wherein the funding account and the receiving account are separate accounts;

accepting, from the user, using the processor, a designation of an intended purpose of use of the amount of funds and a date of intended use of the amount of funds;

transferring the amount of funds from the funding account to the at least one receiving account;

generating, using the processor, for display on a graphical banking interface, a graphical representation of the designation of the intended purpose of use of the amount of funds;

displaying, using the processor, the graphical representation of the designation on an electronic calendar only on or after the date of intended use of the amount of funds; and transferring the amount of funds from the at least one receiving account to the funding account on the date of intended use.

13. A system for facilitating transfers between financial accounts, the system comprising:

an interface to a network-enabled client device, wherein the client device includes a display having a user interface; and a processor configured to:

accept a funds transfer request by a user of an amount of funds between a funding account and at least one receiving account, wherein the funding account and the receiving account are separate accounts;

accept, from the user, a designation of an intended purpose of use of the amount of funds and a date of intended use of the amount of funds;

transfer the amount of funds from the funding account to the at least one receiving account;

generate, for display on the user interface, a graphical representation of the designation of the intended purpose of use of the amount of funds;

display the graphical representation of the designation on an electronic calendar only on or after the date of intended use of the amount of funds; and transfer the amount of funds from the at least one receiving account to the funding account on the date of intended use.

\* \* \* \* \*